United States Patent
Ivanov

(10) Patent No.: US 11,928,243 B2
(45) Date of Patent: Mar. 12, 2024

(54) SYSTEM AND METHOD OF DETECTING HACKING ACTIVITIES DURING THE INTERACTION OF USERS WITH BANKING SERVICES

(71) Applicant: AO Kaspersky Lab, Moscow (RU)

(72) Inventor: Sergey N. Ivanov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 118 days.

(21) Appl. No.: 17/108,435

(22) Filed: Dec. 1, 2020

(65) Prior Publication Data

US 2021/0264059 A1     Aug. 26, 2021

(30) Foreign Application Priority Data

Feb. 26, 2020 (RU) .......................... RU2020108169

(51) Int. Cl.
*G06F 21/62* (2013.01)
*G06F 21/55* (2013.01)

(52) U.S. Cl.
CPC ........ *G06F 21/6263* (2013.01); *G06F 21/552* (2013.01); *G06F 21/554* (2013.01); *G06F 2221/2119* (2013.01)

(58) Field of Classification Search
CPC .. G06F 21/6263; G06F 21/552; G06F 21/554; G06F 2221/2119; G06F 40/30
See application file for complete search history.

(56) References Cited

U.S. PATENT DOCUMENTS

| 10,560,845 B1 * | 2/2020 | Manepalli | H04L 63/08 |
| 2015/0324802 A1 | 11/2015 | Kolkowitz et al. | |
| 2016/0253651 A1 * | 9/2016 | Park | G06Q 20/34 705/39 |
| 2017/0041330 A1 * | 2/2017 | Hunt | H04L 63/1416 |
| 2017/0212875 A1 * | 7/2017 | Foresti | G06F 16/958 |
| 2017/0289168 A1 * | 10/2017 | Bar | H04L 63/1408 |
| 2019/0281064 A1 * | 9/2019 | Patrich | H04L 63/101 |

(Continued)

OTHER PUBLICATIONS

Arwa K. AlSalamah; Security Risk Management in Online System; 2017 5th Intl Conf on Applied Computing and Information Technology/4th Intl Conf on Computational Science/Intelligence and Applied Informatics/2nd Intl Conf on Big Data, Cloud Computing, Data Science (ACIT-CSII-BCD) (pp. 119-124); (Year: 2017).*

(Continued)

*Primary Examiner* — Jahangir Kabir
*Assistant Examiner* — Chao Wang
(74) *Attorney, Agent, or Firm* — ArentFox Schiff LLP; Michael Fainberg

(57) ABSTRACT

An example of a method for detecting hacking activities includes categorizing a plurality of web pages of a web site providing bank services using a trained semantic model. The trained semantic model uses at least one resource identifier of a web page as an input and generates a web page category as an output. One or more attributes of an interaction between a user and bank services are identified. The one or more identified attributes are analyzed by comparing the one or more identified attributes with attributes known to belong to hacking interactions based on a corresponding web page category. Hacking activity is identified based on the results of the analysis.

18 Claims, 3 Drawing Sheets

(56) References Cited

U.S. PATENT DOCUMENTS

2020/0036751 A1* 1/2020 Kohavi .............. H04L 63/1416
2021/0120035 A1* 4/2021 Onut .................. H04L 63/1483

OTHER PUBLICATIONS

Mahmoud Khonji • Youssef Iraqi • Andrew Jones; Phishing Detection: A Literature Survey; IEEE Communications Surveys & Tutorials (vol. 15, Issue: 4, pp. 2091-2121); (Year: 2013).*

Vimal Bibhu • Akhilesh Kumar • Bhanu Prakash Lohani • Pradeep Kumar Kushwaha; Robust Secured Framework for Online Business Transactions over Public Network; 2021 2nd International Conference on Intelligent Engineering and Management (ICIEM ) (pp. 555-560); (Year: 2021).*

* cited by examiner

SYSTEM AND METHOD OF DETECTING HACKING ACTIVITIES DURING THE INTERACTION OF USERS WITH BANKING SERVICES

CROSS-REFERENCE TO RELATED APPLICATION

This application claims benefit of priority under 35 U.S.C. 119(a)-(d) to a Russian Application No. 2020108169 filed on Feb. 26, 2020, which is incorporated by reference herein.

FIELD OF TECHNOLOGY

The invention relates to solutions for ensuring a secure interaction of users with banking services, and, more specifically, to systems and methods for detecting hacking activities during the interaction of users with banking services.

BACKGROUND

At present, the sphere of banking services has expanded significantly. New payment transfer methods for transferring funds from a payer to payee are often provided by banks. A great variety of transaction systems and providers of credit cards and bank services (the bank services being often called remote banking services) allow the user to perform a variety of financial transactions by means of computing devices. Online banking and mobile banking devices make it possible to perform a banking transaction without the use of a credit card or the information of a bank account.

Moreover, many mechanisms exist for protecting the funds of users against unsanctioned access to them by third parties. A two-factor authentication is often used when users access online banking services. This two-factor authentication requires users to enter authentication data (such as a login and password, which may have become accessible to third parties) in the browser on the bank site. In response to receiving user's authentication data the bank typically sends a message to the user's mobile device containing, for example, an additional verification code which must be entered in a special field.

However, it should be noted that many hacker (fraud) attacks exist which may employ vulnerable aspects in the interaction of users with banking services and which may be carried out by malicious actors (hackers) for the purpose of gaining access to the funds of the users. For example, hackers can use phishing sites in an attempt to obtain user's authentication data for online banking. Malicious software (such as remote administration tools) may also allow hackers to steal authentication or sensitive data such as passwords, User-IDs, credit-card number and expiry dates, bank account and PIN numbers, smart-card data, biometric information, and the like. Such sensitive data may allow hackers to perform financial transactions unbeknownst to the users.

Techniques are known in which user devices are identified with so-called digital fingerprinting information in order to protect users against hacking activity. In the general case, banking software for connection to the bank server can maintain fingerprinting information associated with user's devices. In the event that the set of software on the device is changed, or the device itself is changed, there is a high probability that hacking activity is being observed. When hacking activity is performed on a device, the device is considered to be an untrusted device.

However, oftentimes no means for counteracting hacking activity (such as antivirus module configured to perform malware scanning and removal) have been installed on the device of a user. Also, oftentimes the users do not perform an interaction with banking services via banking applications which may contain additional tools for detecting hacking activity (such as SDK functions from the makers of antivirus modules) and report to the bank additional information about the device of the user and the transaction, making it difficult or impossible to identify hacking activity.

Thus, there is a need to identify hacking activity during the interaction of users with banking services by means of a browser.

SUMMARY

Disclosed are systems and methods for detecting hacking activities.

Advantageously, the disclosed aspects identify hacking activity during the interaction of users with banking services by means of a cloud-based security service.

In one aspect, a method is proposed for detecting hacking activities, wherein the method involves steps in which: a plurality of web pages of a web site providing bank services are categorized using a trained semantic model. The trained semantic model uses at least one resource identifier as an input and generates a web page category as an output. One or more attributes of an interaction between a user and bank services are identified. The one or more identified attributes are analyzed by comparing the one or more identified attributes with known attributes of hacking interactions based on a corresponding web page category. Hacking activity is identified based on the results of the analysis.

In one aspect, the one or more attributes include at least: a user activity attribute identifying an action to be performed at the time of the interaction with the bank services, a resource identifier attribute identifying the resource used by the user to perform the action, a device identifier attribute identifying a device used by the user to perform the action.

In one aspect, the action to be performed at the time of the interaction includes at least: user's navigation of the website, user focusing on a navigational element of one of the plurality of webpages, user entering data into one of the plurality of webpages, user sending data to a clipboard, a change in a state of at least one of the plurality of web pages, user interacting with an interface element of one of the plurality of webpages.

In one aspect, the resource identifier attribute is identified by determining at least one of: address of a web page used for the interaction with the bank services, a plurality of keywords associated with the web page, a list of lexemes generated based on the text contained within the web site, and metadata associated with the web page.

In one aspect, the device identifier attribute is identified by determining at least one of: browser information of the browser used for the interaction with the bank services, application information associated with one or more applications interacting with the browser, and device information of the device used for the interaction with the bank services.

In one aspect, analyzing the one or more identified attributes includes categorizing the one or more identified attributes into one or more categories.

In one aspect, categorizing the user activity attribute further includes identifying an actor performing the action. The actor includes a person or a robot.

In one aspect, the plurality of web pages is categorized based on juxtapositioning of particular words contained within the plurality of web pages and based on frequency of occurrence of particular words contained within the plurality of web pages.

In one aspect, categorizing the plurality of web pages further includes categorizing the particular words using a word significance indicator and a word weight factor.

In one aspect, the word weight factor is calculated using a calculated TF (Term Frequency)-IDF (Inverse Document Frequency) value associated with the corresponding word.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for detecting hacking activities during the interaction of users with banking services. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
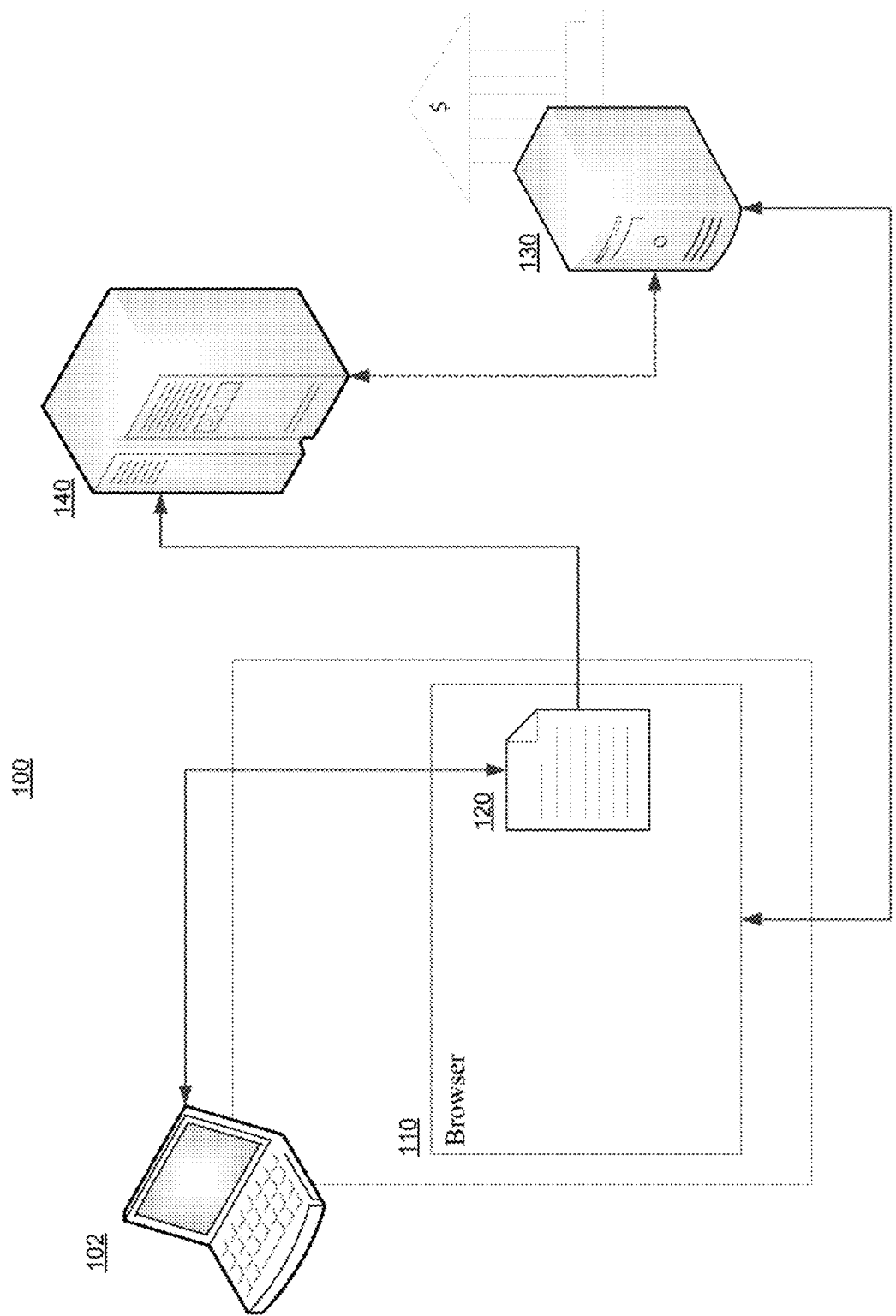
FIG. 1 shows a block diagram of an example of a system for detecting hacking activities.

FIG. 1 shows a block diagram of an example of a system for detecting hacking activities.

The system for detecting hacking activities 100 may include a web browser 110 (referred to as hereinafter as "browser"), implemented on the user's computing device 102, a script 120, executed by the browser 110, a remote server 130, which provides banking services to the user, and with which the user interacts by means of the computing device 102, and a cloud security service 140, with which the script 120 interacts.

The computing device 102 (hereinafter, the device 102) may contain a run time environment of the browser 110.

In the general case, during the interaction of users with a remote server 130 (by means of a browser 110 running on a computing device 102, the remote server 130 may send to the browser 110 a web page which may contain a script 120 (such as a script written in JavaScript language).

In a particular aspect, the remote server 130 may be, but is not limited to:
a bank server (that may be configured to provide services such as: payments, credits, loyalty programs);
a server of a microfinance organization (that may be configured to provide services such as: payments, credits);
a server of an online store (that may be configured to provide services such as: loyalty programs);
a server of a provider of telecommunication services (that may be configured to provide services such as: payments, loyalty programs);
a server of a logistical (transportation) company (that may be configured to provide services such as: payments, loyalty programs).

Microfinance is a provision of financial services such as loans, insurance, and so forth offered by different types of service providers for low-income clients. For simplicity of explanation, reference will be made below to "bank server" 130 even though other remote servers may be performing the functions.

In an aspect, the computing device 102 may execute the script 120 upon opening in the browser 110 the web page received from the bank server 130. The script may contain a sequence of interactions (user activities).

In the general case, the disclosed system may identify scripts which are highly likely associated with hacking activities during the interaction of the user with the remote server 130. The likelihood of the script to be associated with the hacking activities may exceed, for example, a predetermined threshold value of 0.95.

As noted above, the script may contain a set (sequence) of interactions. The interaction of the user with the bank server 130 may contain at least the following attributes (the attributes are described in greater detail below with respect to the cloud security service 140):
at least one action of the user to be performed at the time of the interaction;
at least one identifier of the resource (resource identifier) on which the user is performing the interaction;
at least one identifier of the user device used for the interaction.

The identification of the attributes of the interaction between the user and the bank server 130 may be performed by the script 120 executed as a result of opening in the browser 110 the web page received from the bank server 130.

In a particular aspect, the script 120 may identify at least the following actions of the user when working with the web page received from the bank server 130:
user's navigation of the bank services web site (i.e., the consecutive movement between web pages or elements of web pages by means of clicks, page scrolling, and the like);
user focusing on a navigational elements of a web page (i.e., user placing the mouse cursor on a given web page element or user focusing on a given web page element by means of the keyboard or some other input device associated with the computing device 102);
user entering data into a web page (including the use of specialized interface elements, such as forms, entry fields, navigation panel, and so forth);
the sending of data to a clipboard;
a change in a state of the web page (for example, by the changing of a cookie, upon expiry of a time limit);
user interacting with an interface element of a web page (i.e., pressing a mouse button, including double clicking, entering text from a keyboard or pressing individual keys on the keyboard, dragging an interface element, and the like);
control by the user of modules and applets embedded in the page (such as an embedded video player);
the above indicated actions with respect to accessory elements of the web site, such as, but not limited to popup windows, embedded pages (iframe) and the like.

In order to identify the resource identifier (e.g., location where the user is located), the script 120 may be configured to gather the following information:
- the URL (Uniform Resource Locator) for the web page;
- a plurality of key words associated with the web page (such as words having a length greater than 2 characters);
- concrete lexemes created on the basis of the text contained on the web site, including convolutions computed with the created lexemes;
- convolutions based on scripts contained on the web site or accessory web site elements, such as popup windows, embedded pages, and the like;
- meta-data information of the web page, including at least:
  - the web page header;
  - metadata content tagged with the tag <meta>;
  - addresses of downloadable libraries of scripts and style sheets (CSS), that perform a number of functions, including, for example, object registration, destruction, and management, as well as the parameters of those libraries (version numbers, sizes, types and the like);
  - the streaming media resources used on the web page (including pictures, audio and video streaming data);
  - web application frameworks used in creating the web site (such as React, Angular JS (Java Script) and the like);
  - the structure of the web site.

In order to identify the device identifier attribute, the script 120 may be configured to gather the following information:
- available information about the browser program 110;
- available information about the external application program plugin modules interacting with the browser 110;
- available information about the device of the user 102 (for example, the network address such as IP-address, a device address such as a MAC address, information about the processor, and the like).

In an aspect, in response to opening the web page, the browser 110 may send the browser identification information and/or the device identification information to the bank server 130. This information may be part of the HTTP request string, beginning with "User-Agent", and usually including information such as the name of the browser 110, the version of the browser 110, information about the operating system of the computing device 102 (its name, version, and so forth), the language of the operating system of the computing device 102, and other similar information. The data containing the browser identification information and/or device identification information may be obtained by the script 120 or computed by the security service 140 on the basis of the information obtained by the script 120.

In an aspect, the script 120 may send the data related to the interactions of the user to the security service 140. In an aspect, the script 120 may also be configured to identify any changes in a state of the web page as a result of the user interaction s, in case of dynamic web pages being used. It should be noted that when dynamic web pages are used, changes on the web page may be rendered in the browser 110, while the address of the web page remains the same.

In an aspect the cloud security service 140 may be configured to categorize the identified attributes into one or more categories based on the data received from the script 120.

The cloud security service 140 may categorize the activity attribute (at least one action of the user being performed at the time of the interaction) into one of the following categories:
- viewing of data on the web page obtained from the bank server 130;
- entering of data on the web page obtained from the bank server 130;
- interaction with the web page obtained from the bank server 130;
- copying of data contained on the web page obtained from the bank server 130;
- executing search queries on the web page obtained from the bank server 130;
- executing identified scripts on the web page obtained from the bank server 130.

For example, the cloud security service 140 may discover that the user enters data (by focusing on an interface element of the web page and entering data in the interface element on the web page), and then presses a button (interacting with an interface element on the web page). As another non-limiting example, the cloud security service 140 may discover that there is no entering of data by the user, but only an interaction with the interface element on the web page. As yet another non-limiting example, the cloud security service 140 may discover that the user is viewing the web page (no interaction with the elements, only a navigation based on movement of the mouse pointer, pressing of the cursor buttons on the keyboard, or scrolling from a touch screen).

In one aspect, while categorizing the user activity attribute, the cloud security service 140 may further identify an actor performing the action, based on the activity attribute. In one aspect, the actor may include at least a robot (bot) or a person. The attributes of a bot may include, but are not limited to:
1) text input without typing (i.e., either instantaneous, or with high frequency of character entry);
2) uniform jumping from one web page element to other web page elements (for example, by switching of focus without mouse movements or pressing of the tabulation key <Tab>);
3) ignoring of elements of the web page utilizing the focus indication (for example, an element may be present on the web page which should not be visible to the user, nevertheless the cloud security service 140 may detect an entry made in such element, or may detect an interaction with such element).

In order to categorize the resource identifier attributes, the cloud security service 140 may be configured to analyze the address of the web page as identified by the script 110, and may be configured to analyze the plurality of keywords associated with the web page.

In order to categorize the device identifier attributes, the cloud security service 140 may analyze the device information received from the script 120.

Depending on the IP address of the device 102, the cloud security service 140 may be able to identify the reputation of the IP address. The cloud security service 140 may also be configured to determine whether there are signs that the IP address of the user's device 102 is being anonymized. From the "User-Agent" data, the cloud security service 140 may determine whether the device 102 was previously used (based on an analysis of prior sessions of user's interaction with the bank server 130), or may determine whether the device 102 is a new device that was never encountered before. In one aspect, the cloud security service 140 may additionally analyze whether the user's interaction is taking place during one or several sessions with the bank server 130.

It should be noted that, in an aspect, prior to identifying and analyzing the interaction, resource identifier and device identifier attributes, the cloud security service 140 may be configured to perform the initial categorization of the web pages obtained from the bank server 130. In an aspect, the bank server 130 may store the plurality of web pages (both their content and code) of the web site. In response to the user accessing the web site, the bank server 130 may send one of the plurality of web pages to the browser 110 being implemented on the device of the user 102. In the context of the present disclosure, the categorization of the web pages of the web site that is stored on the bank server 130, may be performed based on the juxtaposition of each word within the web site and based on the most often encountered words within the website.

In an aspect, the cloud security service 140 may perform the initial categorization of the web site of the bank server 130 using a trained semantic model. The cloud security service 140 may be configured to utilize the following resource identifiers as the input of the trained semantic model: the URL of the web page, the key words associated with the web page, and the meta-data information associated with the web page. The semantic model may be configured to provide the category of the web page as the output.

During the categorization step (step 210 shown in FIG. 2), from the set of words picked out from the URL or from the headers on the web page, the cloud security service 140 needs to determine the most likely category using the semantic model. To achieve this result, the cloud security service 140 uses an approach in which each word from the collection "votes" for the categories associated with that word. The "vote" cast by the word for a particular category may reflect the significance (for example, frequency of use) of the word for this particular category. At the same time, the "votes" of widely used words may have lower effect on the categorization (lower weight) than the "votes" of words specific to the category. As the weight factor of a word for a category, the cloud security service 140 may use the TF-IDF (TF—term frequency, IDF—inverse document frequency) value associated with the word. Advantageously, the TF-IDF value may take into account the frequency of the word and the extent of its occurrence. In other words, the TF-IDF value is a statistical measure that may be used to assess the importance of a word in the context of a document (such as a web page). In turn, the web page may be a part of a collection of documents or a corpus of documents. The word weight factor (weight of a particular word) may be proportional to the frequency of use of that word in the document (for example, a web page) and inversely proportional to the frequency of use of the word in all the documents of the collection (for example, a web site). In the context of the present disclosure, the document may be the text posted on the web page. Accordingly, the cloud security service 140 may utilize the corpus of the texts to evaluate the word.

In an aspect, the cloud security service 140 may use a search robot (web crawler) to run through the web pages of the web site of the bank server 130. In one aspect, the cloud security service 140 may only run (crawl) through public pages of the web site. In another aspect, the cloud security service 140 may additionally run through the personal accounts of the users (and other pages which may be only accessible after authorization). In yet another aspect, the cloud security service 140 may additionally run through attached documents posted on the web pages. The search robot may run through the web pages of the web site of the bank server 130 both recursively and iteratively. In other words, the search robot may run not only through the sites of a given address, but also sites whose addresses are found on the web pages of the web site of the bank server 130 and referring to external addresses with respect to the web site of the bank server 130.

As a result of the run through the web site with the search robot, the cloud security service 140 may collect a corpus of texts corresponding to a particular category. The collected texts may describe services or applications provided by the bank server 130. For example, the section of a web site for accounts on web pages may contain a group of texts related to savings accounts with various conditions. The collected texts, in turn, may contain a significant number of words. The cloud security service 140 may also collect all the words forming the address of the web page. The cloud security service 140 may also collect all words contained in the meta-data associated with the web pages (such as page headers). It should be understood that the web sites of bank servers 130 may be created according to generally accepted standards, having structured headers and using a navigation by "navigation breadcrumbs". But generally, the web sites of bank servers 130 may be optimized for a search during their creation and maintenance, and therefore an effort is made to properly use words pertaining to the search topic in the addresses, the meta-information, and the content of the web page. Such optimization may enable the search robots of known search engines (Google, Yahoo, Yandex) to run through the web site of the bank server 130, and may enable the search engine, in response to a query from a user, to render results relevant to the user's query, and so that the web pages from the web site of the bank server 130 end up in these search results.

Table 1 below presents various categories that may be used by the cloud security service 140 for web site categorization purposes and also for identifying hacking activity:

TABLE 1

| Category | Description |
| --- | --- |
| | General collection of categories |
| account | accounts, deposits |
| additional | additional services-safe deposit box rental, etc. |
| business | corporate services |
| cards | bank cards |
| insurance | insurance |
| investments | investments |
| loans | loans |
| payments | payments |
| bonus | bonus programs |
| profile | user profile and settings |

To prepare the corpus of the texts, the cloud security service 140 may utilize the sections with the descriptions of services from the web site provided by the bank server 130. The collected corpus of texts may include N text documents, where N is equal to the number of web page categories.

Due to the limited size of the collected corpus of texts, the volumes of the texts may differ considerably for different categories. Furthermore, common words present in the texts of the majority of categories may result in an inaccurate assessment of the most probable category for a particular web page. To address these shortcomings, the cloud security service 140 may employ the following techniques in an aspect:

normalization of the frequencies of word values in the categories by the size of the corpus of texts of the category; in other words, the total of the normalized frequencies of words for the category may be equal to 1.0;

correction in the corpus of texts for common words that are important for defining the categories (such as "payment"), in order to correct the weight of the word in the corresponding category.

In an aspect, the cloud security service 140 may use the following formulas (1)-(3) to calculate the TF-IDF value. For illustrative purposes only assume that: D represents the corpus of all texts (documents), N=|D| represents the number of categories (documents) in the corpus of texts, d|∈D represents a text (document) associated with a category.

Then the cloud security service 140 may use the following formulas (1)-(3) to calculate the TF-IDF value:

$$tf(t, d) = \frac{f_{t,d}}{\sum_{t' \in D} f_{t',d}} \quad (1)$$

(1) represents the normalized frequency of the word in the document, $$idf(t, d) = \log\left(1 + \frac{N}{n_t}\right) \quad (2)$$

(2) represents the smoothed inverse frequency for all of the documents, tfidf(t,d)=tf(t,d)*idf(t,D) (3) represents the weight factor of the word in the category, being the product of the aforementioned two factors As a result of calculating TF-IDF values, advantageously, the cloud security service 140 may sort all the words encountered during the crawl of the website in terms of their significance (based on TF-IDF values). Table 2 below presents an example of such sorted collection of words (at least some words may be incomplete)

TABLE 2

Words according to significance (TF-IDF value)

| Category | Total words | Top 20 words |
|---|---|---|
| account | 1143 | Deposit, interest, vklad, renewal, rat, fund, account, amount, capitalization, allow, renew, termination, partial contribution |
| additional | 697 | Safe (for money), arend, lease, rent, boxes, rental of individual deposit individualnogo safes rented boxes |
| bonus | 20 | Rewards, promocode, code, fpl gift, promos reward, лояльнocт promo, loyalty, cashback, points, gift bonuses bonus, |
| business | 1466 | garantii created sketch, corporate, biznesu kassa acquiring, biznesa business garantija factoring leasing acquiring guarantees |
| cards | 1876 | Purchases, mastercard, gold card, via kreditnaja visa, airlines, pokupok limit, cashless karta cards, debit, travel |
| insurance | 788 | Insurance, pension, investment, polis policy, osago, programmes kasko ipp travel programm, premiums, car |

In an aspect, the cloud security service 140 then may pick out words from the URL of the web page sections with the descriptions of services provided by the bank servers 130. The following assumptions may be used by the cloud security service 140 for picking out words from the URL:

an uppercase letter following a lowercase letter is considered the start of a new word;

all non-alphabetical characters are considered to be delimiters;

a list of common words in the particular topic may be used to break up the URL into words in the event of no case differences or other potential delimiters;

all words with length less than 3 characters may be ignored.

In an aspect, after picking out words from the URL of the web page sections, the cloud security service 140 may then pick out words from the meta-data (such as headers) of the web pages of the sections with descriptions of services provided by the bank servers 130. It should be noted that there is no need for checking spelling, as the texts of the headers are typically correct in terms of orthography and require no additional processing, similarly to picking out words from the URLs.

In one aspect, the cloud security service 140 may also employ lexeme analysis for categorization purposes. For example, the words and phrases (of a particular text) may be broken down by the cloud security service 140 into lexemes (sequences of characters specified by rules). For example, distinguished by N consecutive characters, and based on predefined tables for frequency of use of the lexemes, the cloud security service 140 may pick out the words of text contained within the web page, the words from the web page URL, and also the words from the meta-data associated with the web page. In addition to picking out words, the cloud security service 140 may be configured to pick out parts of words, complete sentences, and even convolutions of these. Such functionality may allow the cloud security service 140, on the one hand, to consider words with mistakes to be the same words, and, on the other hand, to identify these mistakes and respond to them individually. For example, lexemes "GoOgle.com" and "google.com" associated with search and other services may be considered as the same word by the cloud security service 140. However, the cloud security service 140 may also realize that the lexeme "GoOgle.com" is more likely to be associated with a phishing attempt than the lexeme "google.com".

As noted above, the cloud security service 140 may generate and train the semantic model for categorization and analysis purposes.

In an aspect, the semantic model may use the web page information provided by the script 120 (such as the resource identifier attribute), as the input. The semantic model may be configured to determine the category of the corresponding web page as its output. It should be understood that in some cases it may be difficult to identify the address of so-called one-page banks. In these cases, the web page may be downloaded dynamically, without changing the address. However, the described above semantic model does not necessarily need the URL data to identify a particular category.

In addition, the semantic model of the web site of the bank server 130 may be retrained (supplemented) by the cloud security service 140. In one aspect, the semantic model can be retrained during the accessing of the bank server 130 by the user. In another aspect, the semantic model of the web site can be retrained upon reaching a predetermined number of accesses (for example, a threshold value of 1000 accesses of the bank server 130 by users). In yet another aspect, the semantic model of the web site of the bank server 130 can be retrained after a predetermined time period (for example, once a day). In yet another aspect, the semantic model of the web site of the bank server 130 may be retrained if the cloud security service 140 discovers that the web site of the bank server 130 has been updated.

It should be understood that semantic model of a web site generated by the cloud security service 140 using the described approach for a particular web site may also be utilized for website analysis of other banks. Moreover, if a support of different region or different language is needed, the cloud security service may supplement the semantic model with at least one corpus of texts of words of the other language (illustrated by the example of Table 2). To accomplish this multilingual functionality, the cloud security service 140 may employ the search robot to run through the web pages of English, Italian, Spanish, etc. versions of the web site. In an aspect, a single semantic model may support several natural languages, since the category of the web page does not change due to the language selected by the user.

In one aspect, for the training of the semantic model and the distinguishing of categories, the cloud security service 140 may employ additional sources (such as the web sites of bank services where the script 120 is not functioning, news publications devoted to the topic of banking and the like). These additional sources may enable the cloud security service 140 to collect more extensive corpuses of texts and further enhance training of the semantic model. In one aspect, the cloud security service 140 may even perform a complete retraining of the semantic model (for example, to update the categories), if certain categories are no longer used or are no longer current. Furthermore, the cloud security service 140 may be configured to retrain the semantic model if the model's performance is unsatisfactory, such as, frequent occurrence of errors when identifying the web page categories.

As described below in conjunction with FIG. 2, at step 240, the cloud security service 140 may be configured to identify a script containing the set (sequence) of interactions of the user which constitute hacking activity of the user in the interaction with the remote server 130.

In various aspects, the cloud security service 140 may utilize the following hypotheses and assumptions in order to identify suspicious sequences of interactions:

- the suspicious sequence contains a pair of starting and risky interactions "identifying hacking activity", hereinafter called a pair (for example, an editing of the user profile, followed by successful transfer of funds to a wallet);
- the starting activity always precedes the risky activity in a chronologically ordered sequence of observed events;
- the pair is not necessarily continuous in time, that is, any number of other interactions may occur between the interactions of the pair;
- the interactions of the pair may span over different interaction sessions of the user;
- the temporal separation between the starting and the risky interaction should not exceed a selected time duration value.

In an aspect, at step 240, the cloud security service 140 may identify scripts containing hacking activity using logical expressions on the identified interaction attributes of the user. The various logical expressions (examples of which are presented below in Table 3) make use of the following:

- text identifiers (the name of the category, a word, substring, or category of the device);
- a logical operator:
- ||—logical "OR",
- &&—logical "AND",
- !—negation;
- other logical operators (such as XOR, the combining of results);
  - a comparison operator and a number (for example, to specify further conditions for the category of the user's device).

In various aspects, the cloud security service 140 may identify the pair for suspicious sequences of interactions by the following conditions:

- the semantic category of the interaction corresponds to a given logical expression;
- given a particular context, the interaction categories of the action of the user correspond to a given logical expression;
- the particular words picked out by the cloud security service 140 from the content of the identifier of the interaction resource contain words corresponding to a given logical expression;
- the content represented by a substring of the resource identifier contains substrings corresponding to a given logical expression;
- the user's device 102 category corresponds to a given logical expression.

TABLE 3

Examples of logical expressions

| Type of field | Examples |
|---|---|
| semantic categories | profile payments \|\| cards |
| interaction categories | browse edit interact |
| words in URL and substrings | perevod \|\| transfer card && !debit success |
| device categories | !IP Reputation \|\| Anonymized IP && New Device Environment == 1.0 User Reputation >0.5 && IP Reputation/ Anonymized IP |

In an aspect, in response to identifying hacking activity, the cloud security service 140 may send the corresponding information about the identified hacking activities to the bank server 130 for further investigation of a possible hacking incident.

A non-limiting example illustrating functionality of the disclosed system is described below.

The cloud security service 140 operationally coupled to the script 120 may discover that the user (having user Reputation>0.5) has entered data ("interact") on a web page having the category of resource identifiers "payments" during an interaction with the bank server 130. After the interaction, the string "success" may appear on the resource identifier. Moreover, the device 102 may be a "new" device (New Device Environment=1.0). The device 102 may be using an IP address which is characteristic of anonymization (Anonymized IP). Furthermore, the cloud security service 140 may employ the script 120 to discover that in another interaction session, within the timeframe of three hours, the same user (having User Reputation>0.5) was editing data ("edit") using another device 102 having a known IP address (IP Reputation) on a web page with the category of resource identifier "profile". Thus, the cloud security service 140 may identify the above interactions as likely hacking activity.

There are known instances where, after editing, for example, the telephone number of a user in a bank profile, the subsequent confirmation of payments occurs via SMS messages arriving at the new telephone number, which may belong to a hacker. Thus, such a script (or pair of interactions) may mean that hacking activity is being carried out. In response, the cloud security service 140 may send the discovered information to the bank server 130 to further investigate a possible hacking incident.

Figure 2:
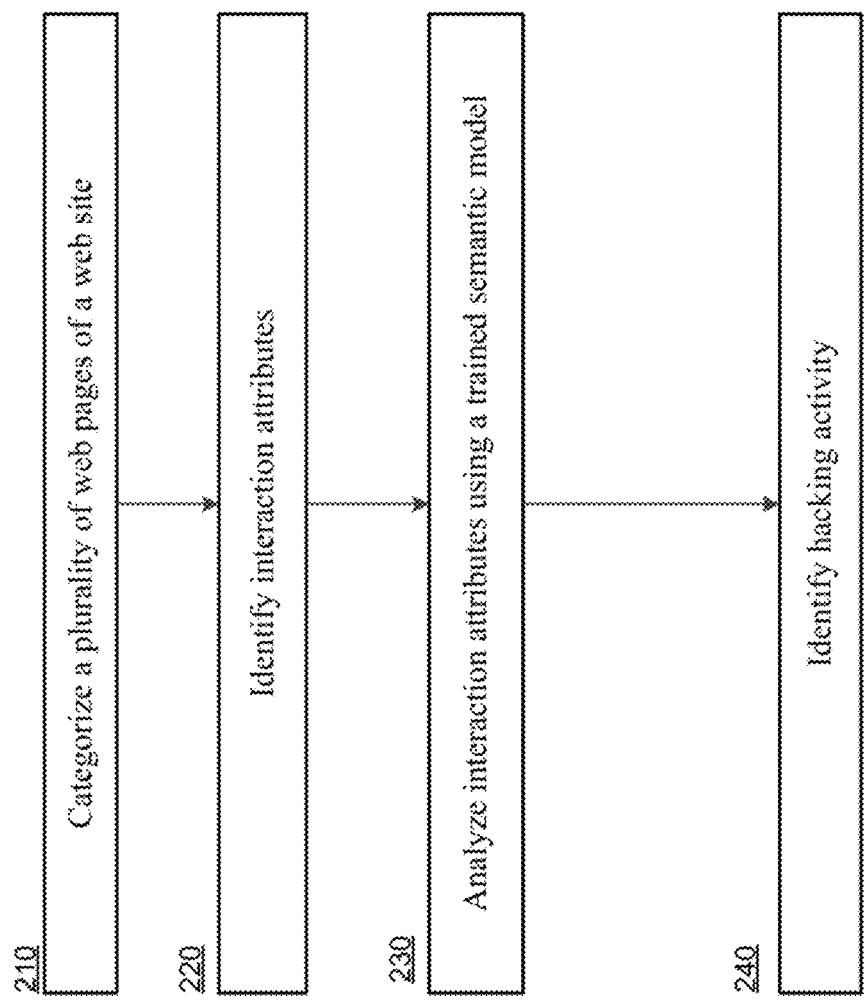
FIG. 2 illustrates an example of a method for detecting hacking activities.

FIG. 2 illustrates a method for detecting hacking activities, in accordance with aspects of the present disclosure.

At step 210, the cloud security service 140 may perform the initial categorization of the web site of the bank server 130 using a trained semantic model, as described above. During the categorization step, from the set of words picked out from the URL or from the headers on the web page, the cloud security service 140 needs to determine the most likely category for each web page using the trained semantic model. In an aspect, the cloud security service 140 may use a search robot (web crawler) to run through the web pages of the web site of the bank server 130. As a result of the run through the web site with the search robot, the cloud security service 140 may collect a corpus of texts corresponding to a particular category. The cloud security service 140 may use the collected corpus to determine the most likely category for a web page. Some examples of such categories are shown in Table 1 above.

At step 220, the interaction attributes of the user when interacting with remote services 130 may be identified using a script 120, which may be implemented in a browser 110 on a user's computing device 102. In one aspect, the interaction attribute may be an action to be performed by the user. In another aspect, the interaction attribute may be the resource identifier of the resource on which the user is carrying out the activity. In one aspect, the resource identifier of the resource may be identified by the cloud security service 140 using the semantic model of the site of the remote service 130. In another aspect, the interaction attribute may be the device identifier of the device 102, from which the activity is carried out.

At step 230, the cloud security service 140 may analyze the identified interaction attributes by comparing the identified interaction attributes of the user's interaction and the attributes of earlier user interactions to predetermined scripts containing hacking activities.

At step 240, the cloud security service 140 may identify hacking activity of the user in response to finding a match between the interaction attributes of current and/or earlier interactions of the user and a known script containing hacking activity.

Figure 3:
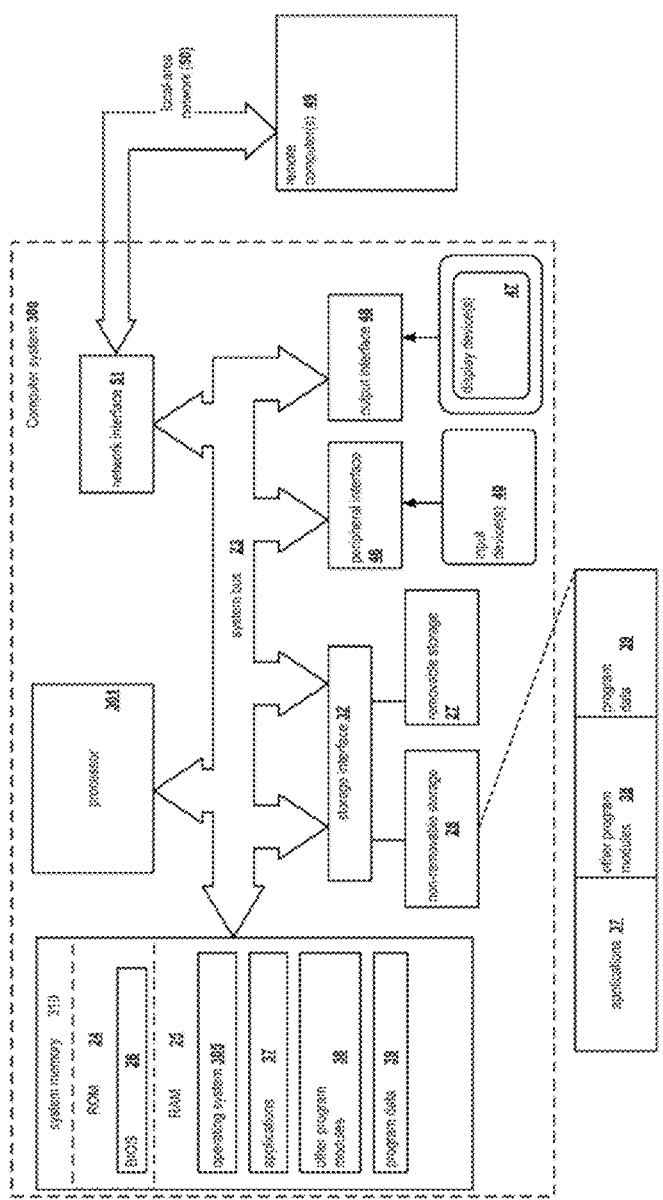
FIG. 3 shows an example of a computer system on which variant aspects of systems and methods disclosed herein may be implemented.

FIG. 3 is a block diagram illustrating a computer system 300 on which aspects of systems and methods for detecting hacking activities may be implemented in accordance with an exemplary aspect. The computer system 300 may represent the computer system 100 of FIG. 1 containing the computing device 102 and the security service 140 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 300 includes a central processing unit (CPU) 301, a system memory 310, and a system bus 23 connecting the various system components, including the memory associated with the central processing unit 301. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 301 (also referred to as a processor) can include a single or multiple sets of processors having single or multiple cores. The processor 301 may execute one or more computer-executable code implementing the techniques of the present disclosure. The system memory 310 may be any memory for storing data used herein and/or computer programs that are executable by the processor 301. The system memory 310 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 300, such as those at the time of loading the operating system with the use of the ROM 24.

The computer system 300 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 300. The system memory 310, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 300.

The system memory 310, removable storage devices 27, and non-removable storage devices 28 of the computer system 300 may be used to store an operating system 305, additional program applications 37, other program modules 38, and program data 39. The computer system 300 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 300 may be equipped with other peripheral output devices (not shown), such as loudspeakers and other audiovisual devices.

The computer system 300 may operate in a network environment, using a network connection to one or more remote computers 49. The remote computer (or computers) 49 may be local computer workstations or servers comprising most or all of the aforementioned elements in describing the nature of a computer system 300. Other devices may also be present in the computer network, such as, but not limited to, routers, network stations, peer devices or other network nodes. The computer system 300 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 300. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting hacking activities, the method comprising:
   categorizing a plurality of web pages of a web site providing bank services using a trained semantic model, wherein the categorizing a plurality of web pages based at least on juxtapositioning of particular words contained within the plurality of web pages, and wherein the plurality of web pages is further categorized based on frequency of occurrence of particular words contained within the plurality of web pages, and wherein the semantic model uses at least one resource identifier of a web page as an input and generates a web page category as an output;

identifying one or more attributes of an interaction between a user and bank services, wherein the one or more attributes comprise at least one of: a user activity attribute identifying an action to be performed at a time of the interaction with the bank services, a resource identifier attribute identifying the resource used by the user to perform the action, a device identifier attribute identifying a device used by the user to perform the action;

sending the device identifier attribute identifying the device to a server associated with the bank services;

analyzing the one or more identified attributes by comparing the one or more identified attributes with known attributes of hacking interactions based on a corresponding web page category and a change of a resource identifier attribute within a predetermined time interval of the interaction between the user and the bank services or a change of a device identifier attribute within the predetermined time interval of the interaction between the user and the bank services;

identifying hacking activity based on results of an analysis;

sending a notification of the hacking activity occurring on the device used by the user to perform the action to the server associated with the bank services; and designating the device used by the user to perform the action and on which the hacking activity is identified as an untrusted device.

2. The method of claim 1, wherein the action to be performed at the time of the interaction comprises at least: user's navigation of a website, user focusing on a navigational element of one of a plurality of webpages, user entering data into one of the plurality of webpages, user sending data to a clipboard, a change in a state of at least one of the plurality of web pages, user interacting with an interface element of one of the plurality of webpages.

3. The method of claim 1, wherein the resource identifier attribute is identified by determining at least one of: address of a web page used for the interaction with the bank services, a plurality of keywords associated with the web page, a list of lexemes generated based on a text contained within the web site, and metadata associated with the web page.

4. The method of claim 1, wherein the device identifier attribute is identified by determining at least one of: browser information of the browser used for the interaction with the bank services, application information associated with one or more applications interacting with the browser, and device information of the device used for the interaction with the bank services.

5. The method of claim 1, wherein analyzing the one or more identified attributes comprises categorizing the one or more identified attributes into one or more categories.

6. The method of claim 5, wherein categorizing the user activity attribute further comprises identifying an actor performing the action and wherein the actor includes a person or a robot.

7. The method of claim 1, wherein categorizing the plurality of web pages further comprises categorizing the particular words using a word significance indicator and a word weight factor.

8. The method of claim 7, wherein the word weight factor is calculated using a calculated Time Frequency (TF) Inverse Document Frequency (IDF) value associated with the corresponding word.

9. A system for detecting hacking activities, the system comprising:
a hardware processor configured to:
categorize a plurality of web pages of a web site providing bank services using a trained semantic model, wherein the categorizing a plurality of web pages based at least on juxtapositioning of particular words contained within the plurality of web pages, and wherein the plurality of web pages is further categorized based on frequency of occurrence of particular words contained within the plurality of web pages, and wherein the semantic model uses at least one resource identifier of a web page as an input and generates a web page category as an output;

identify one or more attributes of an interaction between a user and bank services, wherein the one or more attributes comprise at least one of: a user activity attribute identifying an action to be performed at a time of the interaction with the bank services, a resource identifier attribute identifying the resource used by the user to perform the action, a device identifier attribute identifying a device used by the user to perform the action;

send the device identifier attribute identifying the device to a server associated with the bank services;

analyze the one or more identified attributes by comparing the one or more identified attributes with known attributes of hacking interactions based on a corresponding web page category and a change of a resource identifier attribute within a predetermined time interval of the interaction between the user and the bank services or a change of a device identifier attribute within the predetermined time interval of the interaction between the user and the bank services;

identify hacking activity based on results of an analysis;

send a notification of the hacking activity occurring on the device used by the user to perform the action to the server associated with the bank services; and designate the device used by the user to perform the action and on which the hacking activity is identified as an untrusted device.

10. The system of claim 9, wherein the action to be performed at the time of the interaction comprises at least: user's navigation of a website, user focusing on a navigational element of one of a plurality of webpages, user entering data into one of the plurality of webpages, user sending data to a clipboard, a change in a state of at least one of the plurality of web pages, user interacting with an interface element of one of the plurality of webpages.

11. The system of claim 9, wherein the resource identifier attribute is identified by determining at least one of: address of a web page used for the interaction with the bank services, a plurality of keywords associated with the web page, a list of lexemes generated based on a text contained within the web site, and metadata associated with the web page.

12. The system of claim 9, wherein the device identifier attribute is identified by determining at least one of: browser information of the browser used for the interaction with the bank services, application information associated with one or more applications interacting with the browser, and device information of the device used for the interaction with the bank services.

13. The system of claim 9, wherein the hardware processor configured to analyze the one or more identified attributes is further configured to categorize the one or more identified attributes into one or more categories.

14. The system of claim 13, wherein the hardware processor configured to categorize the user activity attribute is further configured to identify an actor performing the action and wherein the actor includes a person or a robot.

15. The system of claim 9, wherein the hardware processor configured to categorize the plurality of web pages is further configured to categorize the particular words using a word significance indicator and a word weight factor.

16. A non-transitory computer readable medium storing thereon computer executable instructions for detecting hacking activities, including instructions for:
   categorizing a plurality of web pages of a web site providing bank services using a trained semantic model, wherein the categorizing a plurality of web pages based at least on juxtapositioning of particular words contained within the plurality of web pages, and wherein the plurality of web pages is further categorized based on frequency of occurrence of particular words contained within the plurality of web pages, and wherein the semantic model uses at least one resource identifier of a web page as an input and generates a web page category as an output;
   identifying one or more attributes of an interaction between a user and bank services, wherein the one or more attributes comprise at least one of: a user activity attribute identifying an action to be performed at a time of the interaction with the bank services, a resource identifier attribute identifying the resource used by the user to perform the action, a device identifier attribute identifying a device used by the user to perform the action;
   sending the device identifier attribute identifying the device to a server associated with the bank services;
   analyzing the one or more identified attributes by comparing the one or more identified attributes with known attributes of hacking interactions based on a corresponding web page category and a change of a resource identifier attribute within a predetermined time interval of the interaction between the user and the bank services or a change of a device identifier attribute within the predetermined time interval of the interaction between the user and the bank services;
   identifying hacking activity based on results of an analysis;
   sending a notification of the hacking activity occurring on the device used by the user to perform the action to the server associated with the bank services; and
   designating the device used by the user to perform the action and on which the hacking activity is identified as an untrusted device.

17. The non-transitory computer readable medium of claim 16, wherein the action to be performed at the time of the interaction comprises at least: user's navigation of a website, user focusing on a navigational element of one of a plurality of webpages, user entering data into one of the plurality of webpages, user sending data to a clipboard, a change in a state of at least one of the plurality of web pages, user interacting with an interface element of one of the plurality of webpages.

18. The non-transitory computer readable medium of claim 16, wherein the resource identifier attribute is identified by determining at least one of: address of a web page used for the interaction with the bank services, a plurality of keywords associated with the web page, a list of lexemes generated based on a text contained within the web site, and metadata associated with the web page.

* * * * *